April 14, 1964     A. E. WHIPP     3,128,810
FRUIT CORER AND QUARTERING DEVICE

Filed Jan. 10, 1962     2 Sheets-Sheet 1

INVENTOR.
Albert E. Whipp

April 14, 1964  A. E. WHIPP  3,128,810
FRUIT CORER AND QUARTERING DEVICE
Filed Jan. 10, 1962  2 Sheets-Sheet 2

INVENTOR.
Albert E. Whipp

United States Patent Office 3,128,810
Patented Apr. 14, 1964

3,128,810
FRUIT CORER AND QUARTERING DEVICE
Albert E. Whipp, % Canadian Research & Development Foundation, 1434 Queen St. W., Toronto 3, Ontario, Canada
Filed Jan. 10, 1962, Ser. No. 165,413
1 Claim. (Cl. 146—40)

This invention relates to a device for preparing fruit for cooking and the like, wherein a plurality of blades are provided for quartering and coring the fruit.

Various devices have heretofore been proposed for coring and quartering various types of fruit such as, for instance, apples, such devices usually relying on revolving blades or cutters to remove portions of the fruit from about the core. Other devices are provided with a coring tool for first removing the core and other tools for quartering or slicing the fruit for subsequent use.

It is often desirable in preparing fruit, such as apples for cooking and the like, to divide the fruit as well as core it, whereby the fruit is reduced to pieces of more manageable size. The use of a simple knife to core and quarter fruit, while often resorted to, has the disadvantage of being tedious as well as requiring some skill in use to avoid undue waste of the fruit pulp about the core.

Further disadvantages with such prior methods and devices are found in the many parts and linkages often used to provide moving cutters which often tend to clog and become stained with fruit juices. These devices as well as being difficult to clean are also unsanitary.

Accordingly, it is an object of the present invention to provide a fruit corer and quartering device that may be used to simultaneously core and quarter a fruit such as an apple.

It is a further object of this invention to provide a fruit corer and quartering device incorporating an automatic return mechanism to return the cutting blades upon completion of the cutting stroke.

It is another object of this invention to provide a fruit corer and quartering device having cutting blade guide means therein for maintaining the blades in alignment with the fruit during the cutting stroke.

It is a further object of this invention to provide a fruit corer and quartering device having a core ejection device thereon to remove the core from the coring blade.

It is a still further object of this invention to provide a fruit corer and quartering device having a substantially transparent housing therearound, whereby a fruit placed therein may be observed while being cut.

The present invention seeks to achieve these and other objects and features which will be apparent from the following detailed description and accompanying drawings of a presently preferred embodiment, in which like characters refer to like parts, by the provision of a combination coring and quartering blade mounted for reciprocal movement within a housing superimposed on a fruit positioning base.

Figure 1:
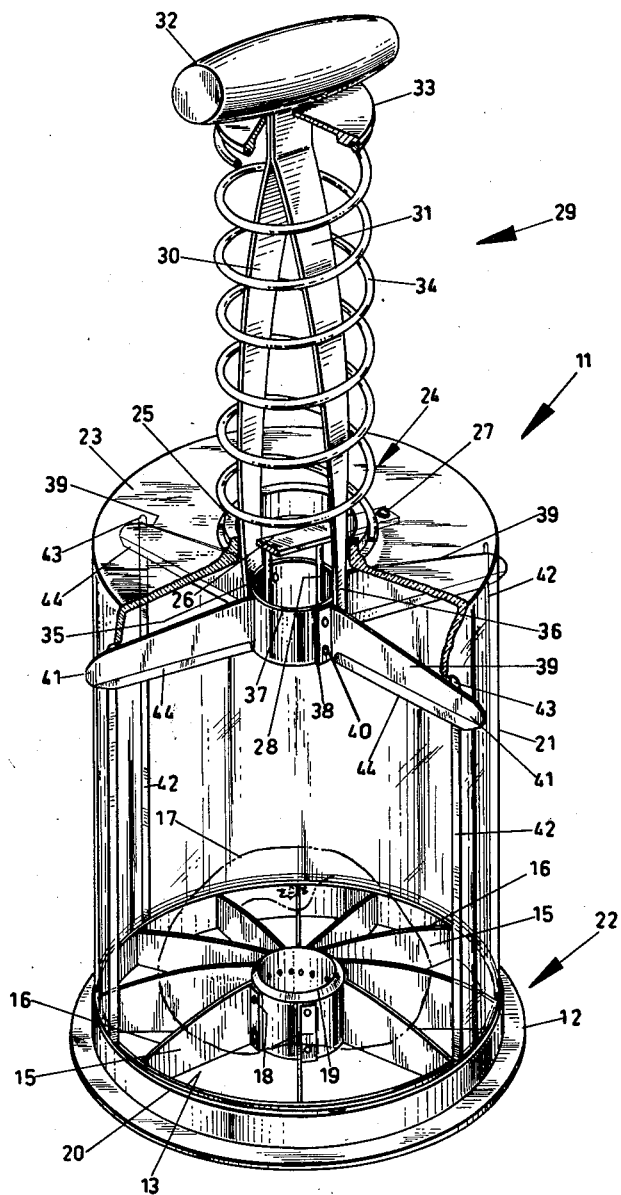
FIG. 1 is a cut-away, perspective view of a presently preferred embodiment of the instant invention showing an apple in position within the device prior to the cutting thereof.

Referring to FIG. 1 the fruit coring and quartering device indicated generally as 11 comprises a preferably circular base 12 having an upwardly turned inner flange 13 secured thereto. A plurality of radial supports 15 are rigidly secured in an upright manner to base 12 and have the upper edges 16 serrated in order to readily grip the undersurface of a fruit such as apple 17 placed thereon. The inwardly dependent ends of supports 15 are secured as at 18 to cylindrical member 19 which is preferably secured to base 12 and further aids in securing supports 15 to base 12.

An upwardly disposed outer flange 20 preferably of a height similar to flange 13 is rigidly secured to base 12, and having a diameter greater than that of flange 13 provides an annular spaced therebetween in which a housing 21 having a generally cylindrical configuration is removably inserted. Housing 21 is preferably made from a transparent material such as clear plastic and has an open end indicated at 22 and a closed end 23. While housing 21 is preferably made from a clear plastic, this is not intended to be a limitation since other suitable materials could be used to form the housing, the material stated being done so by way of example only.

Located substantially centrally of end 23 is a hole indicated as 24 with a rib 25 secured therearound. A core ejector support member 26 is disposed across hole 24 and secured to end 23 as at 27. Projecting inwardly of housing 21 is a core ejector 28 being rigidly secured to support member 26 and located substantially centrally of housing 21.

A cutting blade assembly indicated generally as 29 comprises a pair of central blade supports 30 and 31 secured at the upper end thereof in a handle 32. A circular spring pad 33 is secured about supports 30 and 31 subjacent to handle 32 and supports thereon an upper end of a compression spring 34 which is placed about supports 30 and 31. The lower end of spring 34 is in pressural contact with rib 25 thus supporting handle 32 and blade supports 30 and 31 in a normal position extended from housing 21.

The lower ends 35 and 36 of blade supports 30 and 31 respectively are secured to a coring blade 37 which is preferably circular in shape and having a knife edge 38 formed on the lower edge thereof. A plurality of quartering blades 39, and in this case, four, are rigidly secured to coring blade 37 as at 40 and extend radially outwardly therefrom. The outer ends 41 of blades 39 pass through guide slots 42 formed vertically in housing 21. Guide slots 42 extending substantially the length of housing 21 have upper ends 43 which serve to limit the upward travel of blades 39 and thus assembly 29. All lower edges of quartering blades 39 have knife edges 44 formed thereon.

Figure 2:
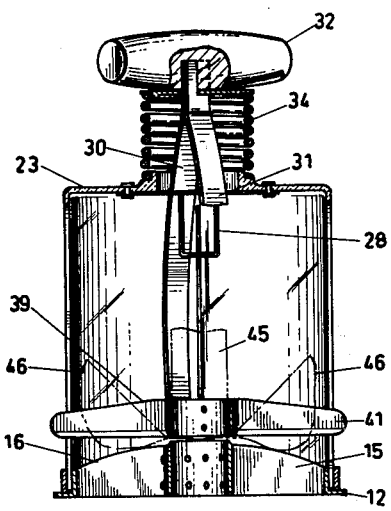
FIG. 2 is a vertical sectional view of the device on a reduced scale as illustrated in FIG. 1 showing the position of the cutting blades upon the coring and quartering of the apple; and, FIG. 3 is a vertical sectional view of the device as illustrated in FIG. 2 showing the return position of the cutting blades and the action of the core ejection device.
Figure 3:
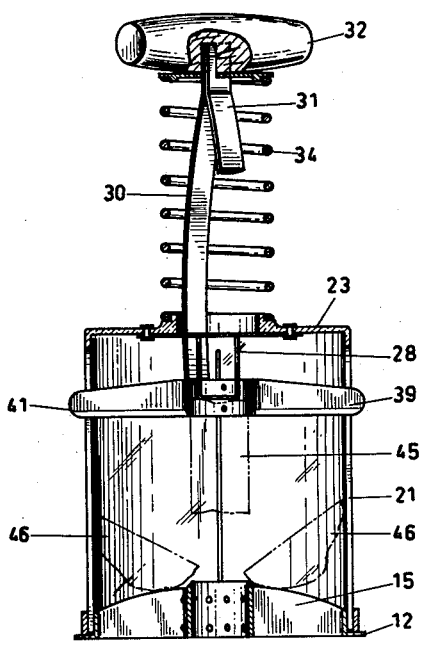

With reference to FIG. 2 and FIG. 3 the method of utilizing the invention is illustrated wherein a fruit such as, for instance, an apple 17 is placed substantially centrally upon supports 15, the serrated edges 16 aiding in maintaining the position of the apple during the cutting stroke. The housing 21 together with blade assembly 29 is then lowered over base 12 and open end 22 is placed within the annular space between flanges 13 and 20.

Handle 32 is then depressed which comprises spring 34 and forces coring blade 37 and quartering blades 39 downwardly to impinge on apple 17. Further pressure will force knife edges 38 and 44 through apple 17 dividing same into core 45 and quarters 46. This point in the method of using this invention is illustrated in FIG. 2 and it is worthwhile to note that housing 21 serves to prevent quarters 46 from slipping or rolling from the device by support of the sidewalls thereof. It will also be noted that spring 34 is in the compressed position and that ends 41 of blades 39 are positioned by guide slots 42.

Upon release of handle 32 the assembly 29 regains the position as illustrated in FIG. 3 on the upstroke spring 34, forcing coring blade 37 upwardly causes core 45 to impinge on core ejector 28 which ejects core 45 from within coring blade 37 from where it drops onto supports 15 on base 12. The housing 21 may then be removed from base 12 in the core 45 and quarters 46 removed.

In the above description and drawings a presently preferred embodiment of this invention is disclosed having four quartering blades, however, it will be understood that a greater or lesser number of blades may be used and that the number of blades as illustrated is done so by way of example only.

From the foregoing it will be apparent that the invention comprises a fruit corer and quartering device having means for holding said fruit and locating it in line with a reciprocably movable cutting blade. Resilient means are provided for biasing the blade away from the fruit upon completion of the cutting stroke. In addition, a core ejector may be provided for removing the core from a coring portion of the blade.

While a preferred embodiment of this invention has been disclosed it will be further understood that restort to various alterations in design may be had while still maintaining the spirit of the invention and falling within the scope of the appended claim.

The embodiments of this invention in which an exclusive property or privilege is claimed are defined as follows:

A fruit corer and quartering device for removing the core and dividing the pulp of said fruit comprising, a base, a transparent housing removeably mounted on said base, said transparent housing having an upper closed end, a cutting blade assembly including a coring blade and at least one quartering blade, said cutting blade assembly being located internally of said housing, bushing guide means perforating said upper closed end of said housing substantially centrally thereof, said cutting blade assembly being carried by spindle means slideably located in said bushing guide means, said cutting blade assembly being reciprocally moveable toward and away from said base, core ejector means secured to said guide means, positioned to eject said core from within said coring blade upon movement of said blade assembly away from said base, the said transparent housing totally enclosing said cutting blade assembly during said removal of the core and dividing of the pulp of said fruit; said base is supplied with a plurality of fruit locating and holding members, said base is further supplied with two upwardly disposed flanges defining an annular space therebetween, said spindle means carrying said cutting blade assembly being divided axially into a pair of blade supports, having upper ends and lower ends, said blade supports being slidably located in said bushing guide means for reciprocal movement therein, a handle including a spring pad rigidly secured to both said upper ends of said blade supports, a compression spring mounted between said closed end of said housing and said spring pad, said spring thus biasing said supports upwardly away from said base, said core ejector being positioned across said bushing guide means, between said blade supports, said core being ejected by said ejector upon said spring biasing said blade supports away from said base.

References Cited in the file of this patent
UNITED STATES PATENTS

| | | |
|---|---|---|
| 53,063 | Vankerson | Mar. 6, 1866 |
| 471,158 | Westerman | Mar. 22, 1892 |
| 857,512 | Baker | June 18, 1907 |
| 1,431,854 | Underwood | Oct. 10, 1922 |

FOREIGN PATENTS

| | | |
|---|---|---|
| 4,278 | Great Britain | of 1912 |
| 186,503 | Switzerland | Dec. 1, 1936 |
| 243,555 | Switzerland | Jan. 3, 1947 |